United States Patent Office 3,316,295
Patented Apr. 25, 1967

3,316,295
PREPARATION OF 2',3'-DICHLORO-4-BIPHENYL-CARBOXYLIC ACID
William H. Starnes, Jr., Baytown, Tex., assignor, by mesne assignments, to Esso Research and Engineering Company, Elizabeth, N.J., a corporation of Delaware
No Drawing. Filed Oct. 1, 1962, Ser. No. 227,597
5 Claims. (Cl. 260—515)

The present invention relates to novel dichlorobiphenylcarboxylic acids and a method for preparing them. Specifically, the present invention relates to 2',3'- and 3',4'-dichloro-4-biphenylcarboxylic acid. The present invention also relates to the ethyl esters of the novel acids.

The dichlorobiphenyl acids of the present invention are characterized by high melting points and by oxidative stability of an order not obtainable in the unsubstituted biphenyl acids. The acids of the present invention exhibit an extremely low solubility in water and are only sparingly soluble in hydrocarbons. The acids are highly desirable as modifiers for alkyd resins and as components for resin plasticizers. The ethyl esters of the acids are useful as high temperature lubricants and as resin plasticizers either per se or as a component of a plasticizer system.

The acids may be formed by reacting p-toluic acid with o-dichlorobenzene in the presence of di-t-butylperoxide and molecular oxygen, suitably in contact with a cobalt catalyst such as cobalt naphthenate, cobalt stearate, cobalt octoate, etc. The reaction is accomplished at a temperature within the range of about 120° C. to 180° C. (preferably, 170–180° C.) and under a pressure sufficient to maintain a liquid phase. Temperatures approaching reflux temperature are preferred. The acid product can be recovered by distilling off the liquids in the reaction product, or by fractional crystallization, etc. Purification of the acid product is accomplished by sequential washing and filtering, using benzene, chloroform, ether, etc., as the wash liquid. The resulting dichlorobiphenylcarboxylic acids may be esterified with ethanol to produce the novel esters, or the novel esters may be prepared by coupling diazotized ethyl-p-aminobenzoate with o-dichlorobenzene under alkaline conditions, as more particularly set forth hereinafter.

The novel acids produced by the practice of the present invention have the structural formulas:

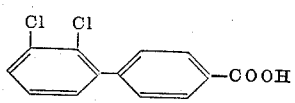

2',3'-dichloro-4-biphenylcarboxylic acid

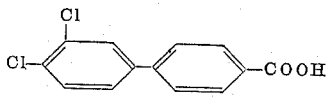

3',4'-dichloro - 4 - biphenylcarboxylic acid. The 2',3'-isomer has a melting point of 259° C. to 261° C.; whereas the 3',4'-isomer melts at 278° C. to 280° C. Both are only slightly soluble in boiling water, boiling benzene, or cold aqueous sodium hydroxide. The acids are in the the form of white, finely divided powder having the appearance of talc. Their structures have been confirmed by independent structural proofs involving chemical reactions, infrared analysis, nuclear magnetic resonance analysis, elemental analysis, and mass spectrographic analysis. In each case, the observed carbon, hydrogen and chlorine contents agreed with the values of the calculated form, as shown in the table below.

TABLE I

| | 2',3'-dichloro-4-biphenylcarboxylic acid | 3',4'-dichloro-4-biphenylcarboxylic acid |
|---|---|---|
| Carbon: | | |
| Calculated | 58.45 | 58.45 |
| Found | 58.04 | 58.02 |
| Hydrogen: | | |
| Calculated | 3.02 | 3.02 |
| Found | 3.11 | 2.99 |
| Chlorine: | | |
| Calculated | 26.55 | 26.55 |
| Found | 26.29 | 26.21 |

Thus, it is seen that the novel acids of the present invention have been well characterized.

The esters of the present invention have melting points considerably lower than the acids. The 2',3'- ester melts at 71° C. to 72° C.; whereas the 3',4'- ester melts at 90° C. to 92° C. Both esters are soluble in common organic solvents such as benzene, xylenes, and hexane at room temperature, but are insoluble in water. The esters are crystalline, exhibiting a fine needle-like structure under a microscope. The esters are readily converted to the corresponding acids by saponification with ethanolic sodium hydroxide and acidification with mineral acids.

As exemplary of the preferred methods of forming compounds of the present invention, the following examples are given.

Example I

A vigorously stirred solution of p-toluic acid (27.2 g., 0.20 mol), cobalt naphthenate (1.0 g. of material containing 6% cobalt), and o-dichlorobenzene (200 ml.) was treated with pure oxygen (about 35 liters per hour) for 7.0 hr. at 170° C. to 180° C. During this time 20.4 g. (0.14 mol) of di-t-butylperoxide was added slowly at a rate of 0.02 mol/hr., and the low-boiling products of the reaction were continuously removed at a rate such that the desired temperature range was maintained. The hot mixture was filtered to remove 12.8 g. (39%) of terephthalic acid, then chilled to 0° C. and refiltered to obtain 4.7 g. (9 percent yield) of solid found to consist largely of 2',3'- and 3',4'-dichloro-4-biphenylcarboxylic acid. The major component was shown to be the 2',3'-isomer; however, fractional crystallization from water gave a small amount of the 3',4'-isomeric material. The structure of both isomers were proven unequivocally by elemental analyses; infrared, NMR (nuclear magnetic resonance), and mass spectral data; and, finally, independent syntheses.

Example II p-Toulic acid (0.20 mol, was oxidized at 160° C. to 178° C. in the manner described in Example I, except that no cobalt naphthenate was used, and the total amount of di-t-butylperoxide charged was 58.4 g. (0.40 mol). After removing the terephthalic acid (39 percent yield), the filtrate was shaken with 100 ml. of 5 percent aqueous sodium hydroxide. The sparingly soluble sodium salt which precipitated was recovered by filtering, washed with small amounts of acetone and cold water, then stirred overnight with an excess of aqueous hydrochloric acid. Upon filtering, 1.9 g. of white solid was recovered. This material was found to be essentially pure 2',3'-dichloro-4-biphenylcarboxylic acid (3.5% yield).

The novel esters in accordance with the present invention may also be produced by reaction of diazotized ethyl-p-aminobenzoate with o-dichlorobenzene under alkaline conditions. In general, the reaction may be carried out by using at least one mol of o-dichlorobenzene per mol of ethyl-p-aminobenzoate, at a pH within the range from about 8 to about 14, at a temperature from about 0° to about 50° C. Higher yields of the desired product e obtained by using excess o-dichlorobenzene; for example, by using 10 mols of o-dichlorobenzene per mol of ethyl-p-aminobenzoate. There is no limit on the amount of excess o-dichlorobenzene which may be employed.

The time of reaction will vary, depending upon the temperature, and, in general, will be within the range from about 1 to about 72 hours. The pH may be controlled by carrying out the reaction in the presence of a hydroxide of an alkali metal or an alkaline earth metal, or in the presence of an alkali metal salt of a weak acid, such as acetic acid.

As exemplary of a specific method of forming the ethyl esters of the novel acids, following, in Example III, is given a method of forming the diazonium salt as well as preparing the esters by the coupling reaction of the present invention.

*Example III*

A suspension of ethyl-p-aminobenzoate (41.3 g., 0.25 mol) in 80 ml. of water was stirred vigorously and treated with 50 ml. of concentrated hydrochloric acid. The resulting mixture was maintained at 0–2° C. while 19 g. (0.275 mol) of sodium nitrite dissolved in 38 ml. of water was added over a thirty minute period. The diazonium salt solution thus formed was added to a three-necked round-bottom Morton flask containing 500 ml. of chilled (3° C.) o-dichlorobenzene. Cold aqueous 5 N sodium hydroxide (56 ml.) was then introduced with rapid stirring, and the mixture was stirred continuously for about 20 hours while it gradually warmed to room temperature. The organic layer was then separated, washed with water, and dried over Drierite. Approximately one-half of this layer was then distilled in vacuo to give 14.5 g. (39 percent based on 0.125 mol of starting ester) of a mixture of the ethyl esters of 2',3'- and 3',4'-dichloro-4-biphenylcarboxylic acids, B.P. 137° C. to 167.5° C./2.5 mm. Hg. The two components were isolated in pure form by flowing the mixture through a chromatographic column containing anhydrous alumina while eluting with a mixture of benzene and 30–60° petroleum ether, and then fractionally crystallizing the narrow-melting chromatographic cuts from 30–60° petroleum ether. The products were characterized as follows:

TABLE II

|  | Ethyl ester of 2', 3'-dichloro-4-biphenylcarboxylic acid | Ethyl ester of 3', 4'-dichloro-4-biphenylcarboxylic acid |
|---|---|---|
| Carbon: | | |
| Calculated | 61.04 | 61.04 |
| Found | 60.81 | 60.87 |
| Hydrogen: | | |
| Calculated | 4.10 | 4.10 |
| Found | 3.99 | 4.06 |
| Chlorine: | | |
| Calculated | 24.02 | 24.02 |
| Found | 23.91 | 23.75 |

The above listed preferred specific examples of the practice of the present invention are exemplary only and the scope of the invention should not be determined therefrom, but rather from the scope of the appended claims.

I claim:
1. A method of preparing 2',3'-dichloro-4-biphenylcarboxylic acid which comprises contacting p-toluic acid and o-dichlorobenzene in a reaction zone at a temperature within the range from about 120° C. to about 180° C., in the liquid phase, in the presence of molecular oxygen and from about 0.5 to 4 mols of di-t-butylperoxide per mol of p-toluic acid to form a product containing 2',3'-dichloro-4-biphenylcarboxylic acid.

2. A method of preparing 2',3'-dichloro-4-diphenylcarboxylic acid which comprises admixing p-toluic acid with a stoichiometric excess of o-dichlorobenzene, and contacting said mixture in the liquid phase with molecular oxygen at a temperature within the range from about 170° C. to about 180° C. while continuously adding about 3 mols of di-t-butylperoxide per 4 mols of p-toluic acid, maintaining said reaction conditions for a period of about 7 hours, terminating said reaction, filtering the reaction products, cooling the reaction products after filtration to about 0° C., and filtering said cooled reaction product to recover 2',3'-dichloro-4-biphenylcarboxylic acid.

3. A method of preparing 2',3'-dichloro-4-biphenylcarboxylic acid which comprises contacting p-toluic acid and o-dichlorobenzene in the liquid phase with molecular oxygen at a temperature within the range from about 120° C. to about 180° C. while continuously adding di-t-butylperoxide, for a time within the range of about 1 to about 28 hours, terminating said reaction, and recovering dichlorobiphenylcarboxylic acid from the reaction products.

4. A method in accordance with claim 3 wherein the di-t-butylperoxide is added to the reactants in a total amount of about 3 mols per 4 mols of p-toluic acid.

5. A method in accordance with claim 4 wherein the temperature is within the range from about 170° C. to about 180° C.

References Cited by the Examiner

UNITED STATES PATENTS

| 3,100,797 | 8/1963 | Harris et al. | 260—515 |
| 3,101,368 | 8/1963 | Schenk | 260—515 |
| 3,108,131 | 10/1963 | Cohen | 260—469 |
| 3,110,724 | 11/1963 | Woodbridge et al. | 260—469 |

OTHER REFERENCES

Huntress et al.: Jour. Amer. Chem. Soc., vol. 61, pp. 1066–1071, 1939.

Musante et al.: Gazz. Chim. Ital., vol. 79, pp. 453–457, 1950.

LORRAINE A. WEINBERGER, *Primary Examiner.*

L. ZITVER, *Examiner.*

R. E. MASSA, T. L. GALLOWAY, *Assistant Examiners.*